(12) United States Patent
Fujita et al.

(10) Patent No.: US 8,159,776 B2
(45) Date of Patent: Apr. 17, 2012

(54) MAGNETIC TAPE DRIVING APPARATUS COMPRISING A TAPE SEPARATION PORTION THAT SEPARATES A MAGNETIC TAPE FROM A MAGNETORESISTIVE HEAD UNIT

(75) Inventors: Masao Fujita, Osaka (JP); Sadamu Kuse, Osaka (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 975 days.

(21) Appl. No.: 12/104,923

(22) Filed: Apr. 17, 2008

(65) Prior Publication Data

US 2008/0259490 A1 Oct. 23, 2008

(30) Foreign Application Priority Data

Apr. 20, 2007 (JP) .................................. 2007-112282

(51) Int. Cl.
*G11B 5/008* (2006.01)
(52) U.S. Cl. ............................................................ 360/95
(58) Field of Classification Search .................... None
See application file for complete search history.

(56) References Cited

U.S. PATENT DOCUMENTS

| 4,656,534 | A | | 4/1987 | Emmerich et al. |
| 5,367,471 | A | * | 11/1994 | Nguyen et al. ............... 360/74.3 |
| 5,434,735 | A | | 7/1995 | Masuda et al. |
| 2004/0141255 | A1 | | 7/2004 | Ogawa et al. |

FOREIGN PATENT DOCUMENTS

| JP | 54-73616 | A | 6/1979 |
| JP | 62-26827 | Y2 | 7/1987 |
| JP | 62-217455 | A | 9/1987 |
| JP | 5-174525 | A | 7/1993 |
| JP | 6-195619 | A | 7/1994 |
| JP | 7-6455 | A | 1/1995 |
| JP | 8-248536 | A | 9/1996 |
| JP | 2543122 | Y2 | 4/1997 |
| JP | 9-251688 | A | 9/1997 |
| JP | 11-328645 | | 11/1999 |
| JP | 2000-113448 | A | 4/2000 |
| JP | 2004-164755 | A | 6/2004 |
| JP | 2006-107637 | A | 4/2006 |
| JP | 2006-127666 | A | 5/2006 |

OTHER PUBLICATIONS

Japanese Office Action issued on Jan. 20, 2011 in corresponding Japanese Patent Application No. 2008-098307.
Japanese Office Action issued Apr. 20, 2010 in Japanese Application No. 2007-280879.
Machine translation of JP-11-328645 dated Nov. 30, 1999.

(Continued)

*Primary Examiner* — David D Davis
(74) *Attorney, Agent, or Firm* — Birch, Stewart, Kolasch & Birch, LLP

(57) ABSTRACT

A magnetic tape driving apparatus of the present invention includes a support member for separating a magnetic tape from a magnetic head on at least one of a tape input side and a tape output side of the magnetic head. The support member separates the magnetic tape from the magnetic head at least when a tape driving portion causes the magnetic tape to start running and/or to stop running. With this configuration, the magnetic tape driving apparatus does not suffer from damage to the magnetic head and the magnetic tape when the magnetic tape makes a transition from the stopped state to the running state and vice versa or changes in the running direction.

10 Claims, 7 Drawing Sheets

OTHER PUBLICATIONS

Machine translation of JP-8-248536-A dated Sep. 27, 1996.
Japanese Notice of Reasons for Rejection mailed Sep. 28, 2010 in Japanese Patent Application No. 2008-098307.

Japanese Office Action dated Nov. 8, 2011, for Application No. 2010-202985.

* cited by examiner

MAGNETIC TAPE DRIVING APPARATUS COMPRISING A TAPE SEPARATION PORTION THAT SEPARATES A MAGNETIC TAPE FROM A MAGNETORESISTIVE HEAD UNIT

BACKGROUND OF THE INVENTION

1. Field of the Invention

The present invention relates to a magnetic tape driving apparatus that can drive a magnetic tape. In particular, the present invention is useful for a magnetic tape apparatus that uses a magnetic sensor head to linearly record data on a magnetic tape with a surface smoothness Ra of 3.0 nm or less.

2. Description of Related Art

A magnetic tape is a kind of magnetic recording medium and for various applications such as an audio tape, a video tape, and a computer tape. Particularly, in the field of backup tapes for computers, tapes with a storage capacity of hundreds of gigabytes per volume have been commercialized along with an increase in capacity of a hard disk to be backed up. In the future, backup tapes with a larger capacity are essential to deal with a further increase in capacity of the hard disk.

For a magnetic tape used as a backup tape, the recording wavelength becomes shorter as the recording capacity increases further, and the surface smoothness has been improved to suppress the degradation of recording/reproducing characteristics due to spacing. When the surface of the magnetic tape is smoothed, the contact area between the magnetic tape and a magnetic head is increased, thus increasing friction between them. Particularly, static friction occurs, e.g., at the time the magnetic tape that is in contact with the magnetic head starts running. If this static friction is increased, the magnetic tape and the magnetic head can be damaged, or the surface of the magnetic tape can be scraped off by the magnetic head to generate foreign matter (contamination). In order to address such static friction between the magnetic head and the magnetic tape, e.g., Patent Document 1 (JP 2006-127666 A) discloses the following technology.

In Patent Document 1, small recesses are formed in a BOT (beginning of tape) portion and an EOT (end of tape) portion so as to reduce static friction between the magnetic tape and the magnetic head during magnetic recording and reproduction. With this configuration, even if the magnetic tape starts running while the magnetic head is positioned at the BOT portion or the EOT portion, tape damage can be suppressed because of reduced static friction.

However, in the configuration of Patent Document 1, the recesses are formed only in the BOT portion and EOT portion of the magnetic tape. Therefore, when the start and stop motions of the magnetic tape are repeated with the magnetic head being in contact with the portion an which no recess is formed) between the BOT and EOT portions, the magnetic head or the magnetic tape are damaged by the static friction between them.

Specifically, when the magnetic tape makes a transition from the stopped state to the running state, it sticks to the magnetic head due to the static friction between the magnetic tape and the magnetic head. Thus, the magnetic tape can be damaged or even cut. The static friction also can damage the MR element or the like of the magnetic head. Moreover, the same problem arises when the magnetic tape makes a transition from the running state to the stopped state. Further, the same problem also arises when the running direction of the magnetic tape is changed from the first (e.g., forward) direction to the second (e.g., reverse) direction and vice versa.

SUMMARY OF THE INVENTION

It is an object of the present invention to provide a magnetic tape driving apparatus that does not suffer from damage to a magnetic head and a magnetic tape when the magnetic tape makes a transition from the stopped state to the running state and vice versa or changes in the running direction, and that can suppress the generation of foreign matter (contamination) and thus can prevent damage such as flaws to the magnetic tape and the magnetic head.

A first configuration of a magnetic tape driving apparatus of the present invention includes a magnetic head unit capable of recording or reproducing information with respect to a magnetic tape, and a tape driving portion that drives the magnetic tape. A tape separation portion that separates the magnetic tape from the magnetic head unit is located on at least one of a tape input side and a tape output side of the magnetic head unit. Friction between the tape separation portion and the magnetic tape is smaller than that between the magnetic tape and the magnetic head unit. The tape separation portion provides a state in which the magnetic tape is in contact with the magnetic head unit and a state in which the magnetic tape is separated from the magnetic head unit. The tape separation portion separates the magnetic tape from the magnetic head unit at least when the tape driving portion causes the magnetic tape to start running and/or to stop running.

A second configuration of a magnetic tape driving apparatus of the present invention includes a tape driving portion that drives a magnetic tape. A magnetic head unit capable of recording or reproducing information with respect to the magnetic tape is movably arranged in the direction perpendicular to a recording surface of the magnetic tape. A magnetic head driving portion is arranged to separate the magnetic head unit from the magnetic tape. The magnetic head driving portion provides a state in which the magnetic tape is in contact with the magnetic head unit and a state in which the magnetic tape is separated from the magnetic head unit. The magnetic head driving portion separates the magnetic head unit from the magnetic tape at least when the tape driving portion causes the magnetic tape to start running and/or to stop running.

The present invention can prevent damage to the magnetic head and the magnetic tape when the magnetic tape starts or stops running. Moreover, the present invention can suppress the generation of foreign matter (contamination) and thus can prevent damage such as flaws to the magnetic tape and the magnetic head.

DETAILED DESCRIPTION OF THE INVENTION

Figure 1A:
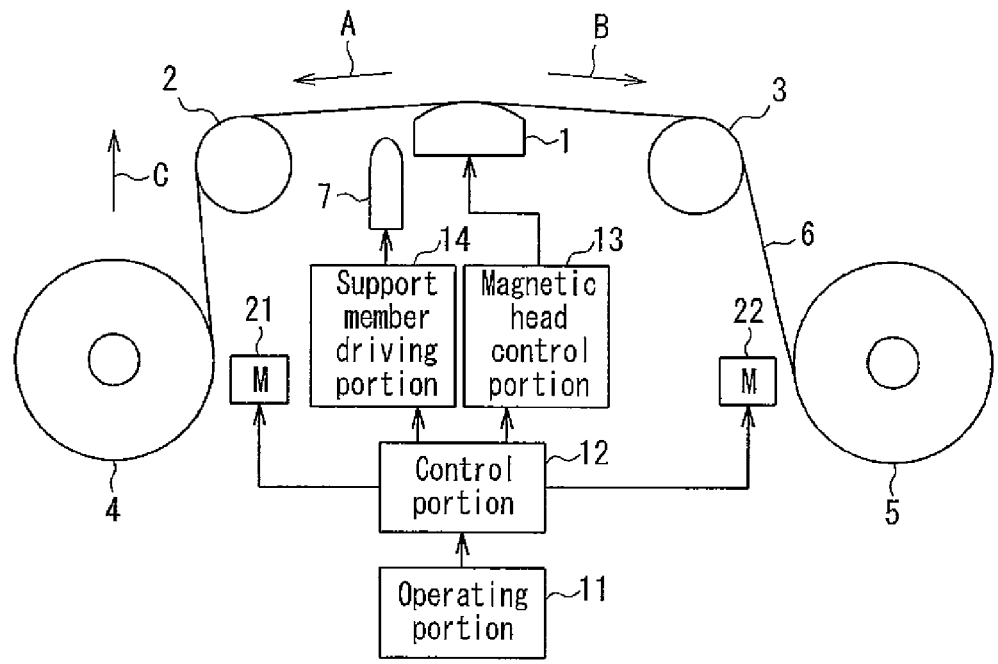
FIG. 1A is a block diagram showing the configuration of a magnetic tape driving apparatus of Embodiment 1.

In the first configuration of the magnetic tape driving apparatus of the present invention, the tape separation portion may include a support member that is movable between a first position at which the support member is located away from the magnetic tape so as to bring the magnetic tape into contact with the magnetic head unit and a second position at which the support member presses the magnetic tape away from the magnetic head unit, and a support member driving portion that moves the support member between the first position and the second position. The support member may be moved to the second position by the support member driving portion to separate the magnetic tape from the magnetic head unit at least when the tape driving portion causes the magnetic tape to start running and/or to stop running.

In the first configuration of the magnetic tape driving apparatus of the present invention, the tape separation portion may include an air injection member that separates the magnetic tape from the magnetic head unit by applying a stream of air to the magnetic tape in contact with the magnetic head unit in the direction in which the magnetic tape is moved away from the magnetic head unit. The air injection member may apply the stream of air to the magnetic tape to separate the magnetic tape from the magnetic head unit at least when the tape driving portion causes the magnetic tape to start running and/or to stop running.

In the first configuration of the magnetic tape driving apparatus of the present invention, the tape separation portion may include a rotatable roller.

In the first configuration of the magnetic tape driving apparatus of the present invention, the tape separation portion may separate the magnetic tape from the magnetic head unit when the tape driving portion causes the magnetic tape to stop running.

In the first configuration of the magnetic tape driving apparatus of the present invention, the support member may come into contact with the magnetic tape before the magnetic tape starts running, the support member may be driven to separate the magnetic tape from the magnetic head unit while the magnetic tape starts running and increases in speed to a constant speed, and the support member may be driven to move away from the magnetic tape after the tape speed reaches the constant speed so that the magnetic tape is brought into contact with the magnetic head unit.

In the first configuration of the magnetic tape driving apparatus of the present invention, the rotatable roller may come into contact with the magnetic tape before the magnetic tape starts running, the rotatable roller may be driven to separate the magnetic tape from the magnetic head unit while the magnetic tape starts running and increases in speed to a constant speed, and the rotatable roller may be driven to move away from the magnetic tape after the tape speed reaches the constant speed so that the magnetic tape is brought into contact with the magnetic head unit.

In the second configuration of the magnetic tape driving apparatus of the present invention, the magnetic head driving portion may move the magnetic head unit in the direction away from the magnetic tape before the magnetic tape stops running.

In the second configuration of the magnetic tape driving apparatus of the present invention, the magnetic head driving portion may move the magnetic head unit so as to be in contact with the magnetic tape after the magnetic tape starts running and reaches a constant speed.

Embodiment 1

Figure 1B:
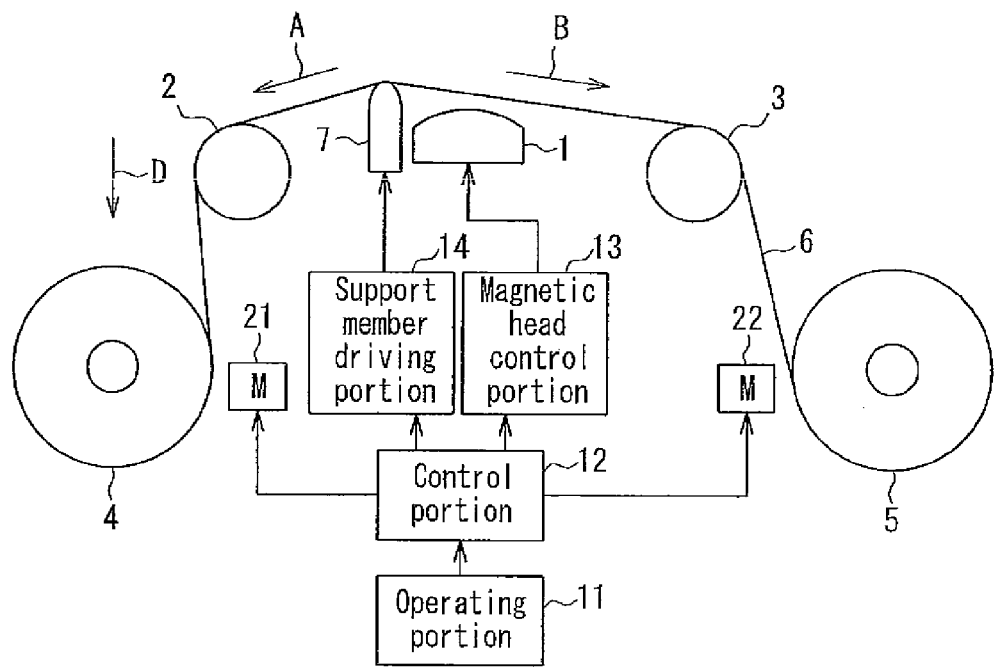
FIG. 1B is a block diagram showing the configuration of a magnetic tape driving apparatus of Embodiment 1.

FIGS. 1A and 1B show the configuration of a magnetic tape driving apparatus of Embodiment 1. A support member 7 is located at a first position in FIG. 1A and at a second position in FIG. 1B.

A magnetic head 1 includes, e.g., an MR (magneto-resistance effect) element and is capable of recording and reproducing various information with respect to a magnetic tape 6. Tape guide members 2, 3 are placed on the input and output sides of the magnetic head 1, and serve to control the winding angle of the magnetic tape 6 or the position of the magnetic tape 6 in the width direction. A first reel 4 is placed in the magnetic tape driving apparatus beforehand, and is rotated by a motor 21. A second reel 5 is placed in a removable cartridge (not shown), and when the cartridge is inserted into the magnetic tape driving apparatus, the second reel 5 is put on a reel table (not shown) of the apparatus. The reel table is rotated by a motor 22 that is driven by a control portion 12. The magnetic tape 6 is a magnetic tape for data recording. The magnetic tape 6 is unwound from the second reel 5, travels through the tape guide member 3, the magnetic head 1, and the tape guide member 2 in this order, and is wound around the first reel 4.

The support member 7 is located in the vicinity of the magnetic head 1 so as to be movable between the first position (FIG. 1A) at which the support member 7 is not in contact with the magnetic tape 6 and the second position (FIG. 1B) at which the support member 7 is moved into the tape path and presses the magnetic tape 6. The surface of the support member 7 that comes into contact with the magnetic tape 6 at the second position is formed of a curved surface to prevent damage to the magnetic tape 6. The support member 7 is moved to at least a position where it can separate the magnetic tape 6 from the sliding surface of the magnetic head 1. The support member 7 may be made of AlTiC ($Al_2O_3$—TiC). Moreover, it is desirable to reduce the radius of curvature of a portion in contact with the magnetic tape 6 so that the contact area between the support member 7 and the magnetic tape 6 becomes smaller. The preferred radius of curvature is, e.g., 4 mm or less.

An operating portion 11 receives various operations in the form of a recording instruction, a stop instruction, etc. from a user. The control portion 12 controls each portion in response to the operations received by the operating portion 11. A magnetic head control portion 13 controls the recording or reproducing operation of the magnetic head 1, based on a control command from the control portion 12. A support member driving portion 14 moves the support member 7 from the first to the second position and vice versa, based on a control command from the control portion 12.

The support member 7 and the support member driving portion 14 are described as an example of a tape separation portion. The tape guide members 2, 3, the control portion 12, and the motors 21, 22 are described as an example of a tape driving portion.

Figure 2A:
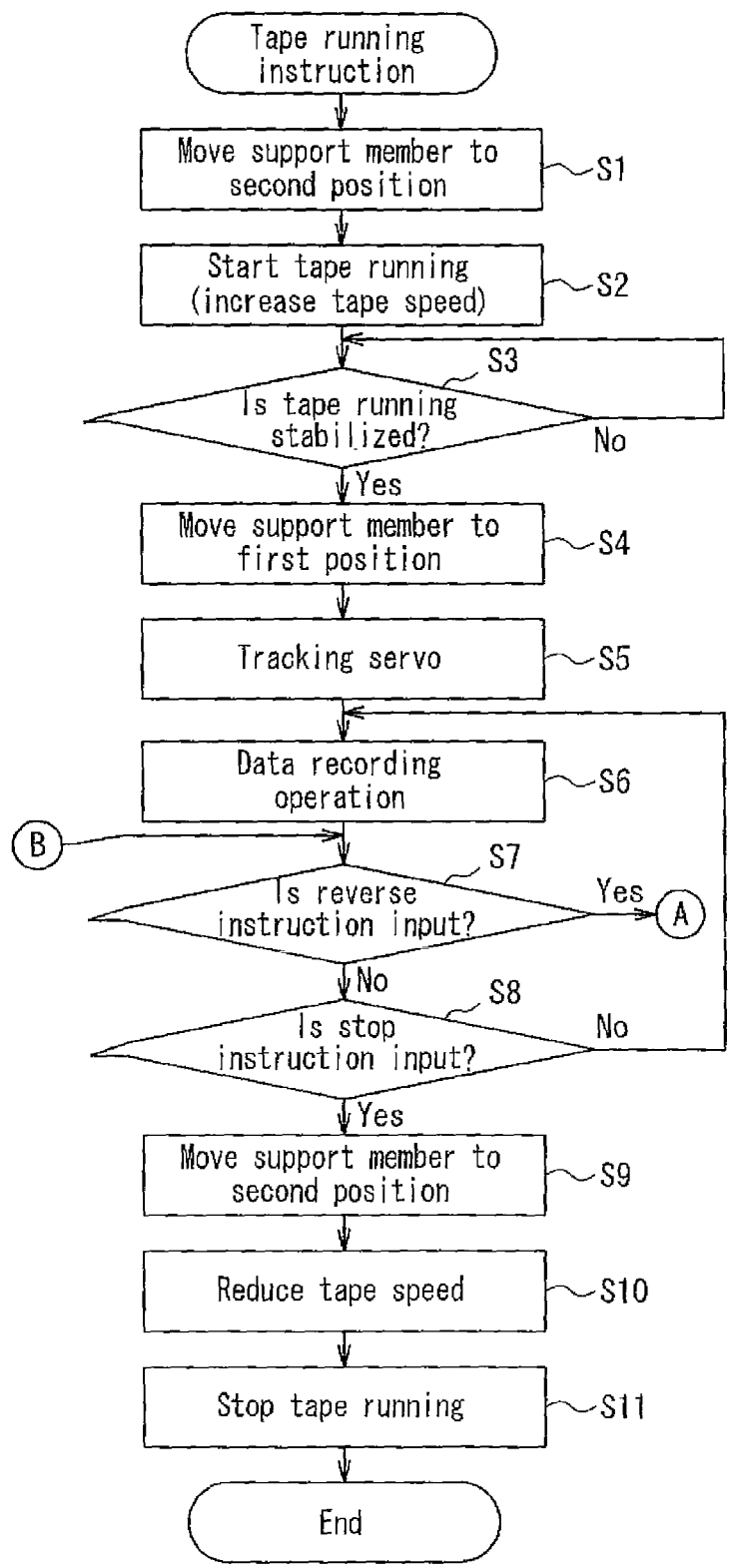
FIG. 2A is a flow chart showing basic operations of a magnetic tape driving apparatus.
Figure 2B:
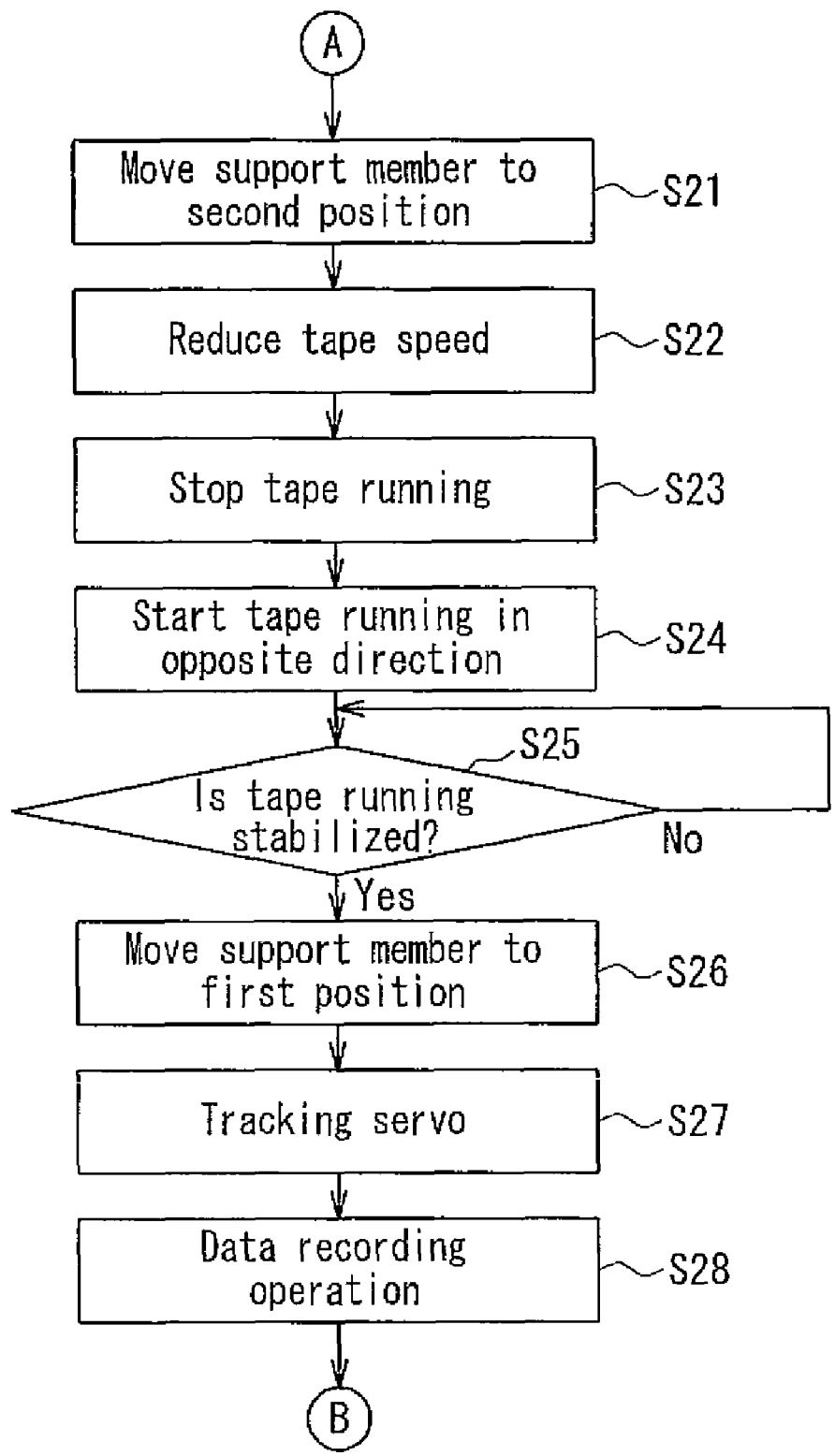
FIG. 2B is a flow chart showing reverse operations of a magnetic tape driving apparatus.

Next, the operations of the magnetic tape driving apparatus will be described. FIGS. 2A and 2B show the operational flow of the magnetic tape driving apparatus of this embodiment. The flow chart of FIG. 2A represents the sequence of operations to record information on the magnetic tape 6.

First, after the magnetic tape 6 is loaded, as shown in FIG. 1A, the magnetic tape 6 is in contact with the sliding surface of the magnetic head 1 and stands still, and the support member 7 is located at the first position. In this state, when a user operates the operating portion 11 to input a recording instruction, the control portion 12 outputs an instruction to drive the support member 7 to the support member driving portion 14. Based on the drive instruction, the support member driving portion 14 moves the support member 7 from the first position to the second position. Then, the support member 7 presses the magnetic tape 6 away from the magnetic head 1 while moving to the second position (S1).

Next, after the support member 7 reaches the second position, the control portion 12 outputs drive instructions to the motors 21 and 22, respectively. Then, the motors 21, 22 are driven to rotate the first and second reels 4, 5, so that the magnetic tape 6 is allowed to run in the direction of the arrow A. In this case, since the magnetic tape 6 has been separated from the magnetic head 1 when it starts running in the direction of the arrow A, no friction occurs between the magnetic head 1 and the magnetic tape 6 (S2).

Subsequently, the control portion 12 controls the motors 21, 22 so that the tape speed of the magnetic tape 6 is increased gradually. Thus, the magnetic tape 6 runs at a predetermined constant speed (S3).

After the tape speed of the magnetic tape 6 is stabilized, the control portion 12 outputs an instruction to drive the support member 7 to the support member driving portion 14. Based on the drive instruction, the support member driving portion 14 moves the support member 7 from the second position to the first position (FIG. 1A). This movement of the support member 7 brings the magnetic tape 6 into contact with the sliding surface of the magnetic head 1. The magnetic tape 6 is running at the time it comes into contact with the magnetic head 1. Therefore, kinetic friction occurs between the magnetic tape 6 and the magnetic head 1. However, the kinetic friction is not likely to damage the magnetic tape 6 and the magnetic head 1 because the coefficient of kinetic friction is smaller than the coefficient of static friction (S4).

Next, the control portion 12 outputs an instruction to perform tracking servo to the magnetic head control portion 13. Based on this instruction, the magnetic head control portion 13 moves the magnetic head 1 in the width direction of the magnetic tape 6 so that a data head provided in the magnetic head 1 follows a predetermined track (S5).

The mechanism for moving the magnetic head 1 in the width direction of the magnetic tape 6 is well known, and the explanation will not be repeated here. The tracking servo of the magnetic tape 6 can be controlled by reproducing a servo signal pre-recorded on the magnetic tape 6 with a servo head provided in the magnetic head 1. The explanations of the servo head, the servo signal, and the specific tracking servo method will be omitted here.

Next, the control portion 12 outputs an instruction to perform data recording to the magnetic head control portion 13. Based on this instruction, the magnetic head control portion 13 controls the recording operation in which the magnetic head 1 writes data on a data track of the magnetic tape 6. In this manner, the data is recorded on the magnetic tape 6 by the magnetic head 1 (S6).

When a user operates the operating portion 11 to input a reverse instruction during the recording of data on the magnetic tape 6, the control portion 12 controls each portion so that the running direction of the magnetic tape 6 is changed. The reverse control will be described in detail later (S7).

When a user operates the operating portion 11 to input a stop instruction during the recording of data on the magnetic tape 6 (S8), the control portion 12 outputs an instruction to drive the support member 7 to the support member driving portion 14. Based on the drive instruction, the support member driving portion 14 moves the support member 7 from the first position to the second position (FIG. 1B). Then, the support member 7 presses the magnetic tape 6 away from the magnetic head 1 while moving to the second position. The magnetic tape 6 is running at the time it comes off the magnetic head 1. Therefore, kinetic friction occurs between the magnetic tape 6 and the magnetic head 1. However, the kinetic friction is not likely to damage the magnetic tape 6 and the magnetic head 1 because the coefficient of kinetic friction is smaller than the coefficient of static friction (S9).

After the support member 7 reaches the second position, the control portion 12 outputs stop instructions to the motors 21 and 22, respectively. Then, the motors 21, 22 perform the decelerating operation in which the number of revolutions of the first and second reels 4, 5 is reduced gradually to reduce the tape speed of the magnetic tape 6 (S10). Consequently, the magnetic tape 6 stops running (S11).

Next, the reverse control will be described.

When a user operates the operating portion 11 to input a reverse instruction while the magnetic tape 6 is running in the direction of the arrow A or B (S7 in FIG. 2A), the control portion 12 controls operations in accordance with the flow chart of FIG. 2B.

First, the control portion 12 outputs an instruction to drive the support member 7 to the support member driving portion 14. Based on the drive instruction, the support member driving portion 14 moves the support member 7 from the first position to the second position (FIG. 1B). Then, the support member 7 presses the magnetic tape 6 away from the magnetic head 1 while moving to the second position. The magnetic tape 6 is running at the time it comes off the magnetic head 1. Therefore, kinetic friction occurs between the magnetic tape 6 and the magnetic head 1. However, the kinetic friction is not likely to damage the magnetic tape 6 and the magnetic head 1 because the coefficient of kinetic friction is smaller than the coefficient of static friction (S21).

After the support member 7 reaches the second position, the control portion 12 outputs stop instructions to the motors 21 and 22, respectively. Then, the motors 21, 22 perform the decelerating operation in which the number of revolutions of the first and second reels 4, 5 is reduced gradually to reduce the tape speed of the magnetic tape 6 (S22). Consequently, the magnetic tape 6 stops running (S23).

Next, the control portion 12 outputs instructions to reverse the rotation directions of the motors 21, 22 (i.e., the running direction of the magnetic tape 6) to the motors 21 and 22, respectively. Then, the motors 21, 22 are driven to rotate the first and second reels 4, 5 in the opposite direction, so that the magnetic tape 6 is allowed to run in the direction of the arrow B. In this case, since the magnetic tape 6 has been separated from the magnetic head 1 when it starts running in the direction of the arrow B, no friction occurs between the magnetic head 1 and the magnetic tape 6 (S24).

Subsequently, the control portion 12 controls the motors 21, 22 so that the tape speed of the magnetic tape 6 is increased gradually. Thus, the magnetic tape 6 runs at a predetermined constant speed. The method for controlling the tape speed of the magnetic tape 6 is well known, and the explanation will not be repeated here (S25).

After the tape speed of the magnetic tape 6 is stabilized, the control portion 12 outputs an instruction to drive the support member 7 to the support member driving portion 14. Based on the drive instruction, the support member driving portion 14 moves the support member 7 from the second position to the first position (FIG. 1A). This movement of the support member 7 brings the magnetic tape 6 into contact with the sliding surface of the magnetic head 1. The magnetic tape 6 is running at the time it comes into contact with the magnetic head 1. Therefore, kinetic friction occurs between the magnetic tape 6 and the magnetic head 1. However, the kinetic friction is not likely to damage the magnetic tape 6 and the magnetic head 1 because the coefficient of kinetic friction is smaller than the coefficient of static friction (S26).

Next, the control portion 12 outputs an instruction to perform tracking servo to the magnetic head control portion 13. Based on this instruction, the magnetic head control portion 13 moves the magnetic head 1 in the width direction of the magnetic tape 6 so that the data head provided in the magnetic head 1 follows a predetermined track (S27).

Next, the control portion 12 outputs an instruction to perform data recording to the magnetic head control portion 13. Based on this instruction, the magnetic head control portion 13 controls the recording operation in which the magnetic head 1 writes data on a data track of the magnetic tape 6. In this manner, the data is recorded on the magnetic tape 6 by the magnetic head 1 (S28).

The subsequent flow returns to the point B in FIG. 2A.

In the above operations, the reverse control of reversing the running direction of the magnetic tape 6 (S23 to S24) is performed while the support member 7 remains at the second position. However, after the magnetic tape 6 stops running (S23), the support member 7 may be moved to the first position so as to bring the magnetic tape 6 into contact with the magnetic head 1. That is, in the flow chart of FIG. 2B, it is also possible to insert a step of moving the support member 7 to the first position and a step of moving the support member 7 back to the second position between S23 and S24.

As described above, this embodiment uses the support member 7 capable of separating the magnetic tape 6 from the magnetic head 1, and thus can reduce the risk of damage to the magnetic head 1 or the magnetic tape 6. In other words, the magnetic tape 6 is temporarily separated from the magnetic head 1 at the time the tape running is started, stopped, and changed in direction. Moreover, the magnetic tape 6 is brought into contact with the magnetic head 1 after the tape running becomes stable. Accordingly, no static friction occurs between the magnetic head 1 and the magnetic tape 6, thereby reducing the risk of damage to the magnetic head 1 (MR element etc.) or the magnetic tape 6.

When the magnetic tape 6 is temporarily separated from the magnetic head 1 during the reversal of the running direction, no static friction occurs between the magnetic tape 6 and the magnetic head 1. Therefore, it is possible to suppress the generation of foreign matter (contamination) from the magnetic tape 6. If static friction occurs repeatedly between the magnetic tape 6 and the magnetic head 1, e.g., in the cone of the reversal of the running direction, the surface of the magnetic tape 6 is slightly scraped off by the magnetic head 1, and foreign matter may be generated. Due to the generation of such foreign matter, when the magnetic tape 6 is wound around the take-up reel, the foreign matter can be sandwiched between the stacked tapes and scratch their surfaces (this phenomenon is referred to as "transfer" in the following), causing damage to the magnetic tape 6. Moreover, if the magnetic tape 6 makes a transition from the stopped state to the running state (i.e., a change from static friction to kinetic friction) or a transition from the running state to the stopped state (i.e., a change from kinetic friction to static friction) with the foreign matter caught between the magnetic head 1 and the magnetic tape 6, they are susceptible to damage such as flaws because of the presence of the foreign matter. By separating the magnetic tape 6 temporarily from the magnetic head 1 during the reversal of the running direction, this embodiment can suppress the generation of foreign matter and thus can prevent not only damage to the magnetic tape 6 caused by the transfer of foreign matter, but also damage to the magnetic head 1 and the magnetic tape 6 caused by foreign matter getting caught between them.

In this embodiment, the support member 7 is located on the tape output side (opposite to the tape guide member 2) of the magnetic head 1 on the premise that the magnetic tape 6 runs in the direction of the arrow A. However, the same effect can be obtained if the support member 7 is located on the tape input side (opposite to the tape guide member 3) of the magnetic head 1. Moreover, the same effect can be obtained even if the support member 7 is located on both the input and output sides of the magnetic head 1.

In this embodiment, the magnetic tape 6 is separated from the magnetic head 1 both when it starts running and when it stops running. However, the magnetic tape 6 may be separated at either the start or stop of the tape running. Such a configuration can reduce damage to the magnetic head 1 and the magnetic tape 6 as well as suppressing the generation of foreign matter (contamination) that is scraped from the magnetic tape 6 by the magnetic head 1.

Embodiment 2

Figure 3A:
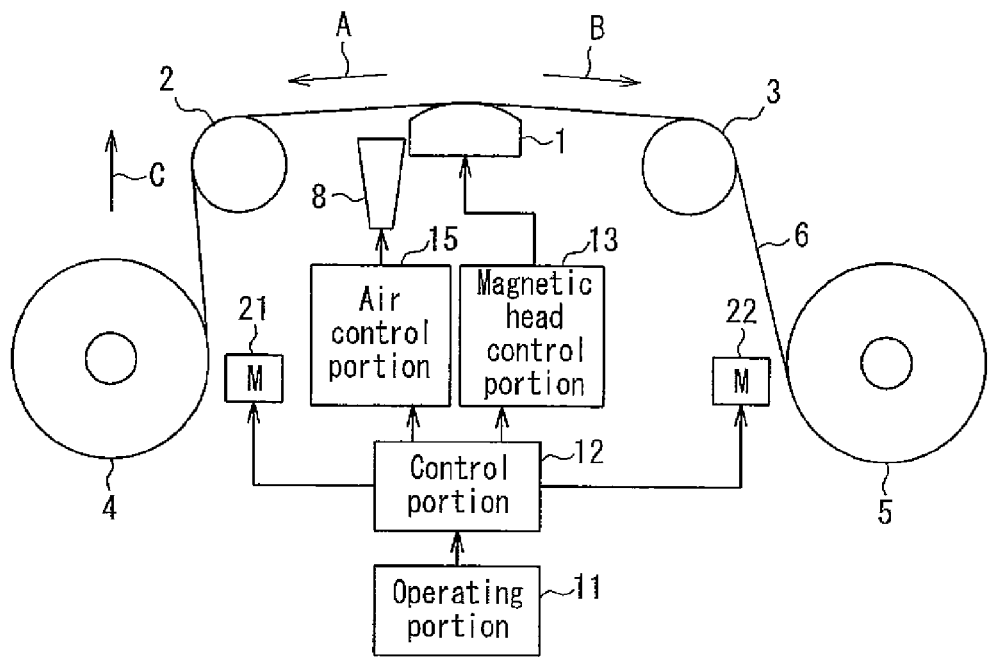
FIG. 3A is a block diagram showing the configuration of a magnetic tape driving apparatus of Embodiment 2.
Figure 3B:
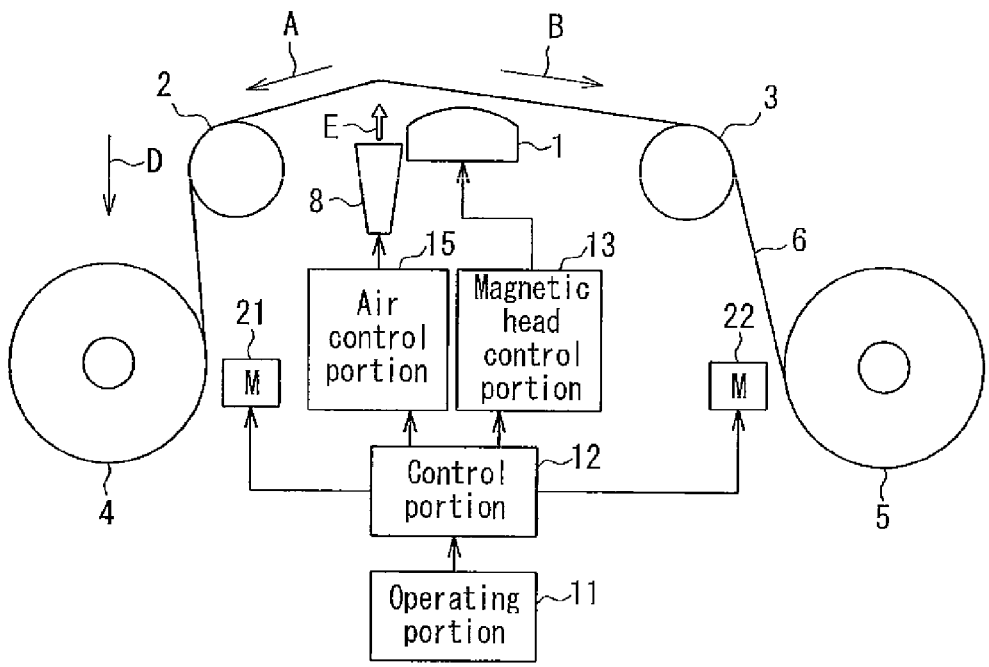
FIG. 3B is a block diagram showing the configuration of a magnetic tape driving apparatus of Embodiment 2.

FIGS. 3A and 3B show the configuration of a magnetic tape driving apparatus of Embodiment 2. This configuration differs from Embodiment 1 shown in FIGS. 1A and 1B in that an air injection member 8 is used instead of the support member 7, and an air control portion 15 is used instead of the support member driving portion 14. The air injection member 8 is located in the vicinity of the magnetic head 1 with its nozzle, through which a stream of air E issues, facing the magnetic tape 6. The air control portion 15 outputs air injection and air stop instructions to the air injection member 8 after the receipt of these instructions from the control portion 12.

The air injection member 8 and the air control portion 15 are described as an example of a tape separation portion.

Although the operations of the magnetic tape driving apparatus of this embodiment are substantially similar to those shown in FIGS. 2A and 2B, the movement control of the support member 7 in the steps S1, S4, S9, S21, and S26 is replaced by the air injection/stop control of the air injection member 8. The other basic operations are the same, and the detailed explanation will not be repeated here.

When the control portion 12 outputs an air injection instruction to the air control portion 15 while the magnetic tape 6 is in contact with the magnetic head 1, as shown in FIG. 3A, the air control portion 15 controls the air injection member 8 so that the stream of air E issues at the timing of S1, S9 (FIG. 2A) and S21 (FIG. 2B). Then, the air injection member 8 applies the stream of air E to the magnetic tape 6 through the nozzle at a predetermined pressure under the control of the air control portion 15. The stream of air E is directed to the magnetic tape 6, so that the magnetic tape 6 is pressed and shifted in the direction of the arrow C. Thus, the magnetic tape 6 is separated from the magnetic head 1, as shown in FIG. 3B. In this case, the pressure of the stream of air E from the air injection member 8 may be high enough to raise the magnetic tape 6 from the magnetic head 1 against at least the static friction between the magnetic tape 6 and the magnetic head 1. Moreover, the air injection member 8 applies the stream of air E continuously during the separation of the magnetic tape 6 from the magnetic head 1, but may apply it intermittently as long as at least the magnetic tape 6 is raised from the magnetic head 1.

When the control portion 12 outputs an air stop instruction to the air control portion 15 while the magnetic tape 6 is separated from the magnetic head 1, as shown in FIG. 3B, the air control portion 15 controls the air injection member 8 so that the stream of air E stops being applied at the timing of S4 (FIG. 2A) and S26 (FIG. 2B). Then, the air injection member 8 stops the application of the stream of air E under the control of the air control portion 15. Consequently, the magnetic tape 6 is shifted in the direction of the arrow D due to the tension exerted by the running control and comes into contact with the sliding surface of the magnetic head 1, as shown in FIG. 3A.

As described above, this embodiment uses the air injection member 8 capable of separating the magnetic tape 6 from the magnetic head 1 by applying the stream of air E to the magnetic tape 6, and thus can reduce the risk of damage to the magnetic head 1 or the magnetic tape 6. In other words, the magnetic tape 6 is temporarily separated from the magnetic head 1 at the time the tape running is started, stopped, and changed in direction. Moreover, the magnetic tape 6 is brought into contact with the magnetic head 1 after the tape running becomes stable. Accordingly, no static friction occurs between the magnetic head 1 and the magnetic tape 6, thereby reducing the risk of damage to the magnetic head 1 (MR element etc.) or the magnetic tape 6.

When the magnetic tape 6 is temporarily separated from the magnetic head 1 during the reversal of the running direction; no static friction occurs between the magnetic tape 6 and the magnetic head 1. Therefore, it is possible to suppress the generation of foreign matter (contamination) from the magnetic tape 6. This can prevent damage to the magnetic tape 6 caused by the transfer of foreign matter.

As a result of suppressing the generation of foreign matter, when the magnetic tape 6 makes a transition from the stopped state to the running state (i.e., a change from static friction to kinetic friction) and a transition from the running state to the stopped state (i.e., a change from kinetic friction to static friction), foreign matter is not caught between the magnetic head 1 and the magnetic tape 6. Therefore, it is possible to prevent damage such as flaws to the magnetic head 1 and the magnetic tape 6.

In this embodiment, the magnetic tape 6 is separated from the magnetic head 1 both when it starts running and when it stops running. However, the magnetic tape 6 may be separated at either the start or stop of the tape running. Such a configuration can reduce damage to the magnetic head 1 and the magnetic tape 6 as well as suppressing the generation of foreign matter (contamination) that is scraped from the magnetic tape 6 by the magnetic head 1.

Embodiment 3

Figure 4A:
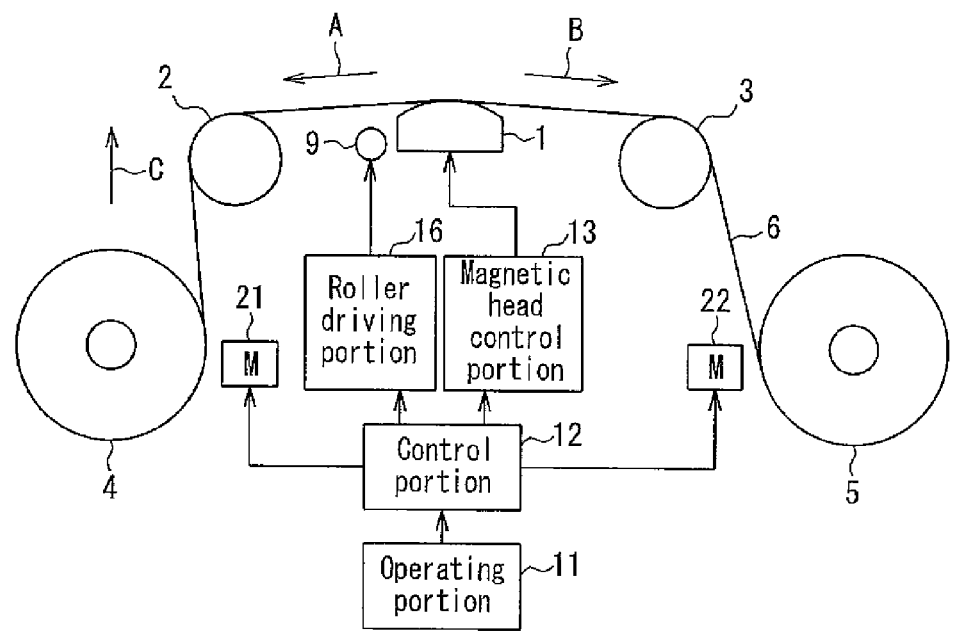
FIG. 4A is a block diagram showing the configuration of a magnetic tape driving apparatus of Embodiment 3.
Figure 4B:
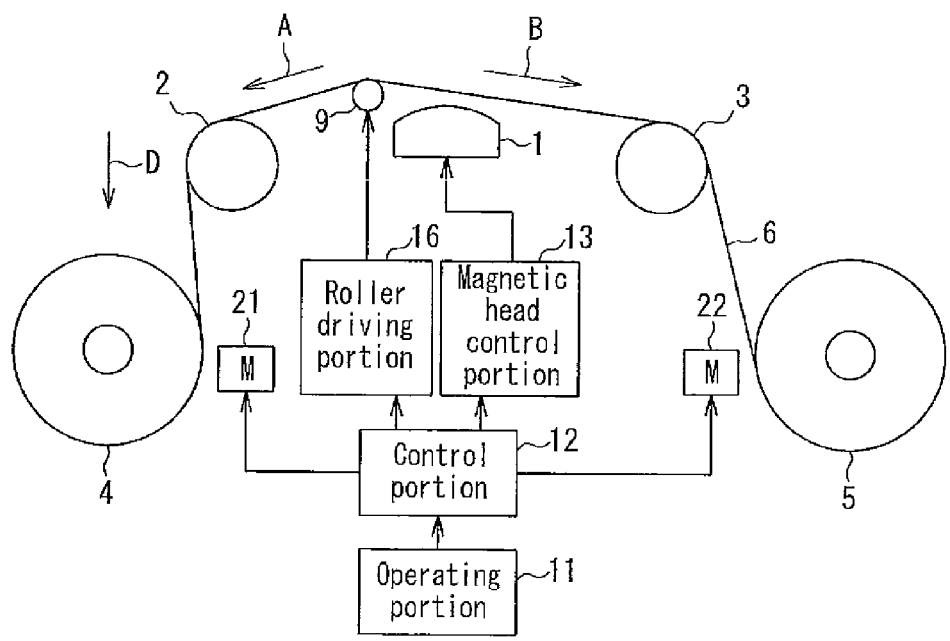
FIG. 4B is a block diagram showing the configuration of a magnetic tape driving apparatus of Embodiment 3.

FIGS. 4A and 4B show the configuration of a magnetic tape driving apparatus of Embodiment 3. This configuration differs from Embodiment 1 shown in FIGS. 1A and 1B in that a rotatable roller 9 is used instead of the support member 7, and a roller driving portion 16 is used instead of the support member driving portion 14.

Figure 5A:
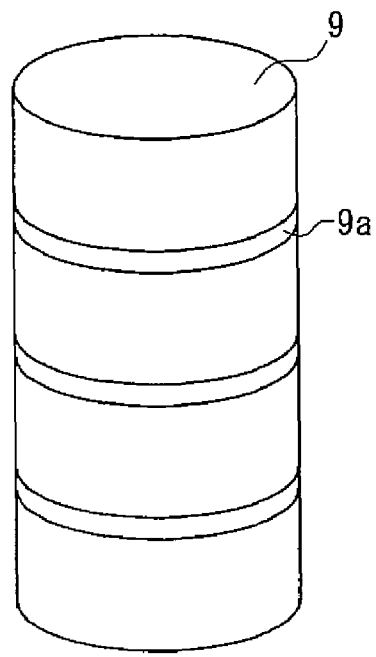
FIG. 5A is a perspective view showing the configuration of a rotatable roller of Embodiment 3.

The rotatable roller 9 is located in the vicinity of the magnetic head 1 so as to be movable between the first position and the second position (as with Embodiment 1). The rotatable roller 9 is configured to rotate in accordance with the running of the magnetic tape 6 when it comes into contact with the magnetic tape 6. The rotatable roller 9 has, e.g., a cylindrical shape as shown in FIG. 5A, and may be made of AlTiC ($Al_2O_3$—TiC). Moreover, it is desirable to reduce the radius of curvature of a portion in contact with the magnetic tape 6 so that the contact area between the rotatable roller 9 and the magnetic tape 6 becomes smaller. The preferred radius of curvature is, e.g., 4 mm or less.

The roller driving portion 16 moves the rotatable roller 9 to the first position or the second position under the control of the control portion 12. When the control portion 12 outputs an instruction to move the rotatable roller 9, the roller driving portion 16 moves the rotatable roller 9 from the first to the second position and vice versa.

The rotatable roller 9 and the roller driving portion 16 are described as an example of a tape separation portion.

Next, the operations of the magnetic tape driving apparatus will be described by focusing on the movement of the rotatable roller 9. Although the operations of the magnetic tape driving apparatus of this embodiment are substantially similar to those shown in FIGS. 2A and 2B, the movement control of the support member 7 in the steps S1, S4, S9, S21, and S26 is replaced by the movement control of the rotatable roller 9. The other basic operations are the same, and the detailed explanation will not be repeated here.

When the control portion 12 outputs a move instruction to the roller driving portion 16 while the rotatable roller 9 is located at the first position, as shown in FIG. 4A, the roller driving portion 16 moves the rotatable roller 9 from the first position to the second position at the timing of St, S9 (FIG. 2A) and S21 (FIG. 2B). Then, the rotatable roller 9 is moved from the first position to the second position under the control of the roller driving portion 16. The rotatable roller 9 presses the magnetic tape 6 while moving to the second position, so that the magnetic tape 6 is shifted in the direction of the arrow C. After the rotatable roller 9 reaches the second position, the magnetic tape 6 is separated from the magnetic head 1, as shown in FIG. 4B.

When the control portion 12 outputs a move instruction to the roller driving portion 16 while the rotatable roller 9 is located at the second position, as shown in FIG. 4B, the roller driving portion 16 moves the rotatable roller 9 from the second position to the first position at the timing of S4 (FIG. 2A) and S26 (FIG. 2B). Then, the rotatable roller 9 is moved from the second position to the first position under the control of the roller driving portion 16. When the rotatable roller 9 reaches the first position, the magnetic tape 6 is separated from the rotatable roller 9. Consequently, the magnetic tape 6 is shifted in the direction of the arrow D due to the tension exerted by the running control and comes into contact with the sliding surface of the magnetic head 1, as shown in FIG. 4A. Although the magnetic tape 6 is separated from the rotatable roller 9 at the first position, the magnetic tape 6 may be in contact with both the magnetic head 1 and the rotatable roller 9. In such a case, the rotatable roller 9 should be placed so as not to affect the predetermined winding angle of the magnetic tape 6 with respect to the magnetic head 1.

As shown in FIG. 5A, a plurality of grooves 9a may be provided in the cylindrical surface (tape sliding surface) of the rotatable roller 9. These grooves 9a can serve to reduce the contact area between the rotatable roller 9 and the magnetic tape 6 when the rotatable roller 9 is moved to the second position. Thus, the running load imposed on the magnetic tape 6 can be reduced.

The grooves 9a also can serve to remove foreign matter from the magnetic tape 6, since foreign matter attached to the surface of the magnetic tape 6 enters the grooves 9a while the magnetic tape 6 is running in contact with the rotatable roller 9. The removal of foreign matter can prevent damage to the surfaces of the magnetic head 1 and the magnetic tape 6. If the magnetic tape 6 is wound around the first reel 4 or the second reel 5 with foreign matter attached to the surface of the magnetic tape 6, the foreign matter can be transferred onto the stacked tapes, causing damage to the magnetic tape 6. Moreover, if the magnetic tape 6 starts or stops running with the foreign matter caught between the magnetic head 1 and the magnetic tape 6, they are susceptible to damage such as flaws because of the presence of the foreign matter. By forming the grooves 9a in the cylindrical surface of the rotatable roller 9 as shown in FIG. 5A, foreign matter attached to the surface of the magnetic tape 6 can be removed. Therefore, it is possible to prevent not only damage to the magnetic tape 6 caused by the transfer of foreign matter, but also damage such as flaws to the magnetic head 1 and the magnetic tape 6 caused by foreign matter getting caught between them.

Figure 5B:
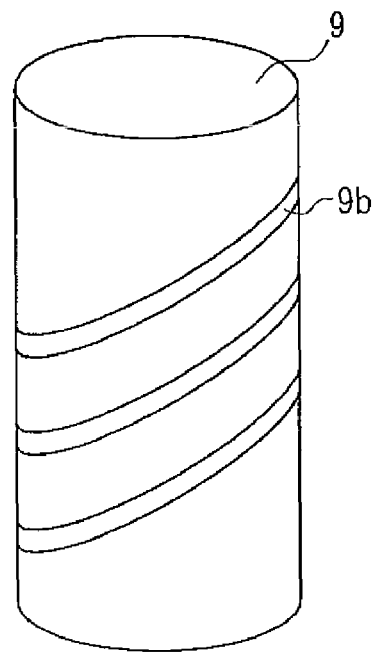
FIG. 5B is a perspective view showing the configuration of a rotatable roller of Embodiment 3.

As shown in FIG. 5B, a spiral groove 9b also may be provided in the cylindrical surface of the rotatable roller 9. When the rotatable roller 9 having the spiral groove 9b is rotated in accordance with the running of the magnetic tape 6, the spiral groove 9b can pass over the entire surface of the magnetic tape 6 in the width direction, so that foreign matter attached to the surface of the magnetic tape 6 can be removed efficiently. Moreover, the spiral groove 9b can serve to reduce the contact area between the rotatable roller 9 and the magnetic tape 6 when the rotatable roller 9 is moved to the second position. Thus, the running load imposed on the magnetic tape 6 can be reduced.

If the magnetic tape 6 moves back and forth in the directions of the arrows A and B within a limited region, foreign matter may be accumulated in the vicinity of the region of the magnetic tape 6 that is subjected to the repeated reverse operations. In this embodiment, however, the rotatable roller 9 is provided with the grooves 9a or 9b to remove foreign matter attached to the surface of the magnetic tape 6. Therefore, even if a portion of the magnetic tape 6 is subjected to the repeated reverse operations, it is possible to prevent the accumulation of foreign matter on the surface of the magnetic tape 6.

As described above, this embodiment uses the rotatable roller 9 that is movable between the first position (FIG. 4A) at which the magnetic tape 6 is in contact with the magnetic head 1 and the second position (FIG. 4B) at which the magnetic tape 6 is separated from the magnetic head 1, and thus can reduce the risk of damage to the magnetic head 1 or the magnetic tape 6. In other words, the magnetic tape 6 is temporarily separated from the magnetic head 1 at the time the tape running is started, stopped, and changed in direction. Moreover the magnetic tape 6 is brought into contact with the magnetic head 1 after the tape running becomes stable. Accordingly, no static friction occurs between the magnetic head 1 (MR element etc.) and the magnetic tape 6, thereby reducing the risk of damage to the magnetic head 1 or the magnetic tape 6.

When the magnetic tape 6 is temporarily separated from the magnetic head 1 during the reversal of the running direction, no static friction occurs between the magnetic tape 6 and the magnetic head 1. Therefore, it is possible to suppress the generation of foreign matter (contamination) from the magnetic tape 6. This can prevent damage to the magnetic tape 6 caused by the transfer of foreign matter.

As a result of suppressing the generation of foreign matter, when the magnetic tape 6 makes a transition from the stopped state to the running state (i.e., a change from static friction to kinetic friction) and a transition from the running state to the stopped state (i.e., a change from kinetic friction to static friction), foreign matter is not caught between the magnetic head 1 and the magnetic tape 6. Therefore, it is possible to prevent damage such as flaws to the magnetic head 1 and the magnetic tape 6.

The formation of the grooves 9a or 9b in the surface of the rotatable roller 9 can reduce the contact area between the rotatable roller 9 and the magnetic tape 6, and thus can reduce the running load imposed on the magnetic tape 6. This configuration is particularly effective when the rotatable roller 9 is located at the second position and in contact with the magnetic tape 6.

The grooves 9a or 9b also can serve to remove foreign matter attached to the surface of the magnetic tape 6. In particular, the groove with a spiral shape like the groove 9b can pass over the entire surface of the magnetic tape 6 in the width direction, so that foreign matter can be removed efficiently. This can prevent not only damage to the magnetic tape 6 caused by the transfer of foreign matter, but also damage to the magnetic head 1 and the magnetic tape 6 caused by foreign matter getting caught between them.

The grooves of the rotatable roller 9 are not limited to the shapes shown in FIGS. 5A and 5B, and may have other shapes as long as at least the contact area between the rotatable roller 9 and the magnetic tape 6 is reduced, and foreign matter attached to the surface of the magnetic tape 6 is removed.

In this embodiment, the magnetic tape 6 is separated from the magnetic head 1 both when it starts running and when it stops running. However, the magnetic tape 6 may be separated at either the start or stop of the tape running. Such a configuration can reduce damage to the magnetic head 1 and the magnetic tape 6 as well as suppressing the generation of foreign matter (contamination) that is scraped from the magnetic tape 6 by the magnetic head 1.

Embodiment 4

Figure 6A:
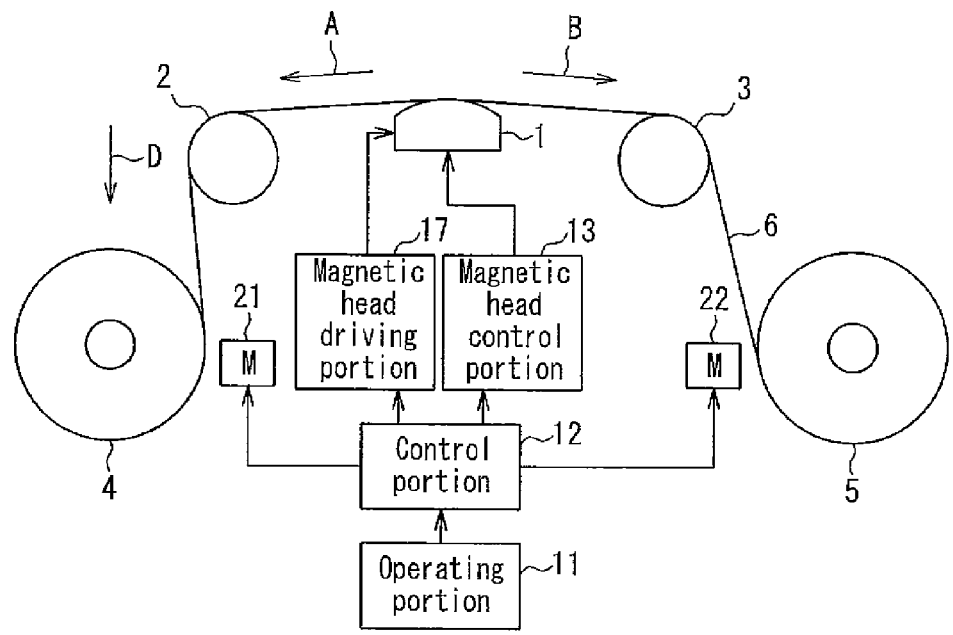
FIG. 6A is a block diagram showing the configuration of a magnetic tape driving apparatus of Embodiment 4.
Figure 6B:
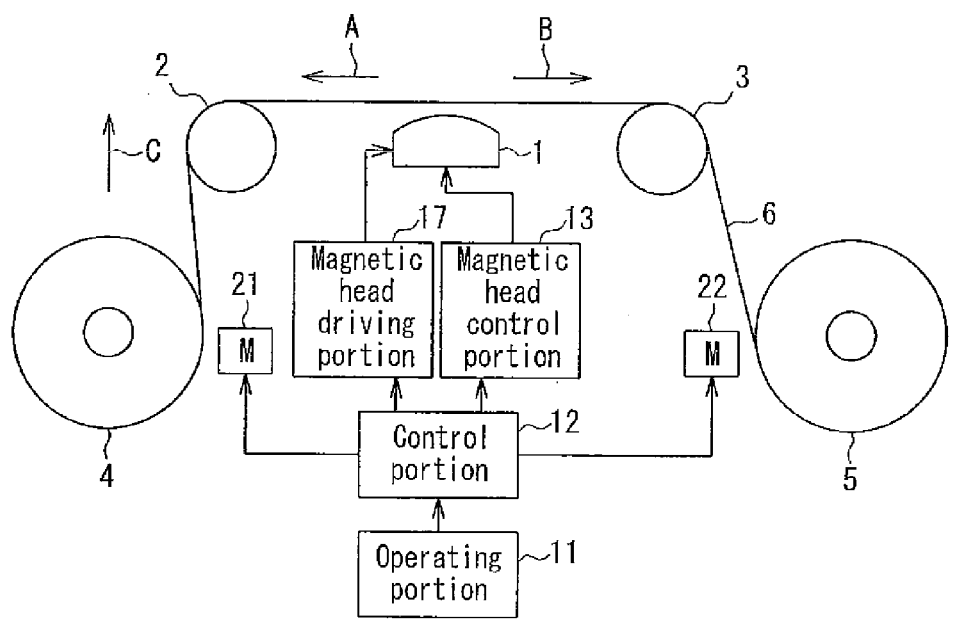
FIG. 6B is a block diagram showing the configuration of a magnetic tape driving apparatus of Embodiment 4.

FIGS. 6A and 6B show the configuration of a magnetic tape driving apparatus of Embodiment 4. This configuration differs from Embodiment 1 shown in FIGS. 1A and 1B in that a magnetic head driving portion 17 is introduced by eliminating the support member 7 and the support member driving portion 14.

Based on an instruction from the control portion 12, the magnetic head driving portion 17 moves the magnetic head 1 between a first position (FIG. 6A) at which the magnetic head 1 is in contact with the magnetic tape 6 and a second position (FIG. 6B) at which the magnetic head 1 is separated from the magnetic tape 6.

Next the operations of the magnetic tape driving apparatus will be described by focusing on the movement of the magnetic head 1. Although the operations of the magnetic tape driving apparatus of this embodiment are substantially similar to those shown in FIGS. 2A and 2B, the movement control of the support member 7 in the steps S1, S4, S9, S21, and S26 is replaced by the movement control of the magnetic head 1. The other basic operations are the same, and the detailed explanation will not be repeated here.

When the control portion 12 outputs a move instruction to the magnetic head driving portion 17 while the magnetic head 1 is located at the second position, as shown in FIG. 6B, the magnetic head driving portion 17 moves the magnetic head 1 from the second position to the first position at the timing of S1, S9 (FIG. 2A) and S21 (FIG. 2B). Then, the magnetic head 1 is moved from the second position to the first position under the control of the magnetic head driving portion 17 and comes into contact with the magnetic tape 6. Thus, the magnetic head 1 can record or reproduce data with respect to the magnetic tape 6.

When the control portion 12 outputs a move instruction to the magnetic head driving portion 17 while the magnetic head 1 is located at the first position, as shown in FIG. 6A, the magnetic head driving portion 17 moves the magnetic head 1 from the first position to the second position at the timing of S4 (FIG. 2A) and S26 (FIG. 2B). Then, the magnetic head 1 is moved from the first position to the second position under the control of the magnetic head driving portion 17 and comes off the magnetic tape 6.

As described above, this embodiment allows the magnetic head 1 to be moved between the first position (FIG. 6A) at which the magnetic head 1 is in contact with the magnetic tape 6 and the second position (FIG. 6B) at which the magnetic head 1 is separated from the magnetic tape 6, and thus can reduce the risk of damage to the magnetic head 1 or the magnetic tape 6. In other words, the magnetic tape 6 is temporarily separated from the magnetic head 1 at the time the tape running is started, sopped, and changed in direction. Moreover, the magnetic tape 6 is brought into contact with the magnetic head 1 after the tape running becomes stable. Accordingly, no static friction occurs between the magnetic head 1 (MR element etc.) and the magnetic tape 6, thereby reducing the risk of damage to the magnetic head 1 or the magnetic tape 6.

When the magnetic tape 6 is temporarily separated from the magnetic head 1 during the reversal of the running direction, no static friction occurs between the magnetic tape 6 and the magnetic head 1. Therefore, it is possible to suppress the generation of foreign matter (contamination) from the magnetic tape 6. This can prevent damage to the magnetic tape 6 caused by the transfer of foreign matter.

As a result of suppressing the generation of foreign matter, when the magnetic tape 6 makes a transition from the stopped state to the running state (i.e., a change from static friction to kinetic friction) and a transition from the running state to the stopped state (i.e., a change from kinetic friction to static friction), foreign matter is not caught between the magnetic head 1 and the magnetic tape 6. Therefore, it is possible to prevent damage such as flaws to the magnetic head 1 and the magnetic tape 6.

The magnetic head driving portion 17 of Embodiment 4 may have not only the function of moving the magnetic head 1 between the first and second positions, but also the function of moving the magnetic head 1 in the width direction of the magnetic tape 6 to perform tracking servo. With this configuration, it is not necessary to prepare an additional means for moving the magnetic head 1 in the direction of the arrow C or D, and thus the number of components can be reduced, resulting in a reduction in cost.

In this embodiment, the magnetic head 1 is separated from the magnetic tape 6 both when the magnetic tape 6 starts running and when the magnetic tape 6 stops running. However, the magnetic head 1 may be separated at either the start or stop of the tape running. Such a configuration can reduce damage to the damage to the magnetic head 1 and the magnetic tape 6 as well as suppressing the generation of foreign matter (contamination) that is scraped from the magnetic tape G by the magnetic head 1.

The magnetic tape driving apparatus of the present invention is useful for an apparatus that uses a magnetic tape as an information medium.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A magnetic tape driving apparatus comprising:
    a magnetoresistive head unit capable of recording or reproducing information with respect to a magnetic tape; and
    a tape driving portion that drives the magnetic tape,
    wherein a tape separation portion that separates the magnetic tape from the magnetoresistive head unit is located on at least one of a tape input side and a tape output side of the magnetoresistive head unit,
    friction between the tape separation portion and the magnetic tape is smaller than that between the magnetic tape and the magnetoresistive head unit,
    the tape separation portion provides a state in which the magnetic tape is in contact with the magnetoresistive head unit and a state in which the magnetic tape is separated from the magnetoresistive head unit,
    the tape separation portion separates the magnetic tape from the magnetoresistive head unit at least before the tape driving portion causes the magnetic tape to start running and performs tracking servo based on a drive instruction so as to prevent static friction between the magnetoresistive head unit and the magnetic tape,
    the tape separation portion separates the magnetic tape from the magnetoresistive head unit at least before the tape driving portion causes the magnetic tape to stop running based on a stop instruction so as to prevent static friction between the magnetoresistive head unit and the magnetic tape, and
    the tape separation portion separates the magnetic tape from the magnetoresistive head unit at least when the tape driving portion reverses a running direction of the magnetic tape based on a reverse instruction so as to prevent static friction between the magnetoresistive head unit and the magnetic tape.

2. The magnetic tape driving apparatus according to claim 1, wherein the tape separation portion comprises:
    a support member that is movable between a first position at which the support member is located away from the magnetic tape so as to bring the magnetic tape into contact with the magnetoresistive head unit and a second position at which the support member presses the magnetic tape away from the magnetoresistive head unit; and
    a support member driving portion that moves the support member between the first position and the second position,
    wherein the support member is moved to the second position by the support member driving portion to separate the magnetic tape from the magnetoresistive head unit at least when the tape driving portion causes the magnetic tape to start running and/or to stop running.

3. The magnetic tape driving apparatus according to claim 2, wherein the support member comes into contact with the magnetic tape before the magnetic tape starts running,
    the support member is driven to separate the magnetic tape from the magnetoresistive head unit while the magnetic tape starts running and increases in speed to a constant speed, and
    the support member is driven to move away from the magnetic tape after the tape speed reaches the constant speed so that the magnetic tape is brought into contact with the magnetoresistive head unit.

4. The magnetic tape driving apparatus according to claim 1, wherein the tape separation portion comprises:
    an air injection member that separates the magnetic tape from the magnetoresistive head unit by applying a stream of air to the magnetic tape in contact with the magnetoresistive head unit in a direction in which the magnetic tape is moved away from the magnetoresistive head unit, wherein the air injection member applies the stream of air to the magnetic tape to separate the magnetic tape from the magnetoresistive head unit at least when the tape driving portion causes the magnetic tape to start running and/or to stop running.

5. The magnetic tape driving apparatus according to claim 1, wherein the tape separation portion comprises a rotatable roller.

6. The magnetic tape driving apparatus according to claim 5, wherein the rotatable roller comes into contact with the magnetic tape before the magnetic tape starts running, the rotatable roller is driven to separate the magnetic tape from the magnetoresistive head unit while the magnetic tape starts running and increases in speed to a constant speed, and the rotatable roller is driven to move away from the magnetic tape after the tape speed reaches the constant speed so that the magnetic tape is brought into contact with the magnetoresistive head unit.

7. The magnetic tape driving apparatus according to claim 1, wherein the tape separation portion separates the magnetic tape from the magnetoresistive head unit when the tape driving portion causes the magnetic tape to stop running.

8. A magnetic tape driving apparatus comprising a tape driving portion that drives a magnetic tape, wherein a magnetoresistive head unit capable of recording or reproducing information with respect to the magnetic tape is movably arranged in a direction perpendicular to a recording surface of the magnetic tape, a magnetoresistive head driving portion is arranged to separate the magnetoresistive head unit from the magnetic tape, the magnetoresistive head driving portion provides a state in which the magnetic tape is in contact with the magnetoresistive head unit and a state in which the magnetic tape is separated from the magnetoresistive head unit, and the magnetoresistive head driving portion separates the magnetoresistive head unit from the magnetic tape at least before the tape driving portion causes the magnetic tape to start running and performs tracking servo based on a drive instruction so as to prevent static friction between the magnetoresistive head unit and the magnetic tape, the tape separation portion separates the magnetic tape from the magnetoresistive head unit at least before the tape driving portion causes the magnetic tape to stop running based on a stop instruction so as to prevent static friction between the magnetoresistive head unit and the magnetic tape, and the tape separation portion separates the magnetic tape from the magnetoresistive head unit at least when the tape driving portion reverses a running direction of the magnetic tape based on a reverse instruction so as to prevent static friction between the magnetoresistive head unit and the magnetic tape.

9. The magnetic tape driving apparatus according to claim 8, wherein the magnetic head driving portion moves the magnetoresistive head unit in a direction away from the magnetic tape before the magnetic tape stops running.

10. The magnetic tape driving apparatus according to claim 8, wherein the magnetic head driving portion moves the magnetoresistive head unit so as to be in contact with the magnetic tape after the magnetic tape starts running and reaches a constant speed.

* * * * *